(12) United States Patent
Hollister

(10) Patent No.: US 10,281,912 B2
(45) Date of Patent: May 7, 2019

(54) AUTONOMOUS INSPECTION SYSTEM

(71) Applicant: Kevin Cole Hollister, Tampa, FL (US)

(72) Inventor: Kevin Cole Hollister, Tampa, FL (US)

( * ) Notice: Subject to any disclaimer, the term of this patent is extended or adjusted under 35 U.S.C. 154(b) by 0 days.

(21) Appl. No.: 15/227,909

(22) Filed: Aug. 3, 2016

(65) Prior Publication Data
US 2018/0036890 A1 Feb. 8, 2018

(51) Int. Cl.
*G05D 1/00* (2006.01)
*H04B 10/25* (2013.01)
*H04B 10/07* (2013.01)
*G01N 21/954* (2006.01)
*G01B 11/25* (2006.01)
*B25J 9/16* (2006.01)
*G01S 13/88* (2006.01)
*G01S 17/88* (2006.01)
*G01S 15/88* (2006.01)
*H04L 29/12* (2006.01)

(52) U.S. Cl.
CPC .......... *G05D 1/0022* (2013.01); *B25J 9/1679* (2013.01); *G01B 11/25* (2013.01); *G01N 21/954* (2013.01); *G01S 13/88* (2013.01); *G01S 15/88* (2013.01); *G01S 17/88* (2013.01); *H04B 10/07* (2013.01); *H04B 10/2504* (2013.01); *G01N 2021/9548* (2013.01); *G05B 2219/45066* (2013.01); *G05D 2201/0207* (2013.01); *H04L 61/6022* (2013.01)

(58) Field of Classification Search
CPC ..... B25J 13/006; B25J 19/023; Y10S 901/44; G05B 2219/45066; G05B 2219/40543
See application file for complete search history.

(56) References Cited

U.S. PATENT DOCUMENTS

2006/0074525 A1* 4/2006 Close ................. B25J 9/1617
700/245
2006/0290779 A1* 12/2006 Reverte ................ E03F 7/10
348/84
2011/0196534 A1* 8/2011 Ekes ................. F16L 55/48
700/259

* cited by examiner

*Primary Examiner* — Dale Moyer
(74) *Attorney, Agent, or Firm* — Cygnet IP Law, P.A.; Stephen W. Aycock, II

(57) ABSTRACT

Systems, methods and computer readable media for autonomous robotic inspection are described. A system can include a robot having one or more processors, a memory device, one or more sensors, a communications interface and a locomotion subsystem. The system can also include a base unit coupled to the robot via a fiber optic cable and having a mechanical tether connected to the robot for retrieving the robot.

18 Claims, 5 Drawing Sheets

AUTONOMOUS INSPECTION SYSTEM

FIELD

Embodiments relate generally to inspection systems and, more particularly, to autonomous or semi-autonomous mobile robotic inspection systems.

BACKGROUND

Areas that may be difficult and/or hazardous for humans to access may need inspection from time to time. Such areas can include water pipes, sewer pipes, manufacturing plants, hazardous waste disposal areas, areas contaminated with hazardous substances, and/or other areas difficult to access and/or hazardous to humans. Robotic inspection systems can be helpful for inspecting such areas.

Robotic inspection systems can be autonomous and/or manually controlled (e.g., remote operated vehicles or ROVs). Some conventional robotic inspection systems may depend on a tether unspooling to measure distance traveled by the robot (e.g., the amount of tether that has been unwound approximates the distance traveled by the robot). However, these systems may be limited by the length of the tether and/or by the accuracy of the length of tether unwound accurately representing distance traveled.

Also, some conventional robotic inspection systems may rely on a single robot and may collect and store data in the robot for later download or retrieval. It may be advantageous for a group of autonomous robots to work together to reduce inspection times and also for the robot to have an ability to transmit collected data in real-time (or near real-time) to an external system.

Embodiments were conceived in light of the above-mentioned problems and limitations, among other things.

SUMMARY

Some implementations can include an autonomous robotic inspection system. The system can include a robot having one or more processors, a memory device, one or more sensors, a communications interface and a locomotion subsystem. The system can also include a base unit coupled to the robot via a fiber optic cable and having a mechanical tether connected to the robot for retrieving the robot.

The one or more processors in the robot can be configured to perform operations including determining a position of the robot relative to another object including determining a distance traveled based on a signal sent via the fiber optic cable. The operations can also include acquiring information from the one or more sensors and relating the acquired information with the determined position. The operations can further include transmitting, via the fiber optic cable, the information to an external system as a real-time data feed from a location within the other object, wherein the information can include one or more of a still image and a video.

The system can also include a removable programming and monitoring system configured to connect to the base unit and exchange data with the robot via the base unit. The communications interface can include a wireless communications interface and the transmitting can include wirelessly transmitting the information to one or more of an external system or another robot.

The base unit can include a wireless communication interface and the base unit can be configured to receive the information from the robot and wirelessly transmit the information to another system. The robot can be directly connected to a network and can include a unique identifier for identifying the robot as a device on the network. The unique identifier can be one of a MAC address, an Internet Protocol address (or other identifier) and the network can be the Internet, a wide area network (WAN), a grid/mesh network, a local area network (LAN) or the like.

Some implementations can include a method for autonomous robotic inspection. The method can include determining, at a robot having a processor, a position of the robot relative to another object including determining a distance traveled. The method can also include acquiring, at the robot, information from one or more sensors and relating, at the robot, the acquired information with the determined position. The method can further include transmitting, from the robot, via a communications link, the acquired information to an external system as a real-time data feed from a location within the other object, wherein the acquired information can include one or more of a still image and a video, and autonomously traversing a course through the other object.

The method can further include connecting to a removable programming and monitoring system and exchanging data between the robot and the removable programming and monitoring system via a base unit coupled to the robot. The communications interface can include a wireless communications interface and the transmitting can include wirelessly transmitting the information to one or more of an external system or another robot.

Determining a distance traveled can include sending a signal via a fiber optic connection coupling the robot to a base unit. The robot can be directly connected to a network and can include a unique identifier for identifying the robot as a device on the network. The unique identifier can be one of a MAC address, an Internet Protocol address (or other identifier) and the network can be the Internet, a wide area network (WAN), a grid/mesh network, a local area network (LAN) or the like. Determining a distance traveled can include using one of an acoustic signal, an ultrasonic signal, a laser, and a radio frequency signal to determine distance traveled by the robot.

Some implementations can include a nontransitory computer readable medium having software instructions stored thereon that, when executed by a processor, cause the processor to perform operations. The determining, at a robot including the processor, a position of the robot relative to another object can include determining a distance traveled.

The operations can also include acquiring, at the robot, information from one or more sensors. The operations can further include relating, at the robot, the acquired information with the determined position. The operations can also include transmitting, from the robot, via a fiber optic cable, the acquired information to an external system as a real-time data feed from a location within the other object, wherein the acquired information can include one or more of a still image and a video. The operations can further include autonomously traversing a course through the other object.

The operations can further include connecting to a removable programming and monitoring system and exchanging data between the robot and the removable programming and monitoring system via a base unit coupled to the robot. The communications interface can include a wireless communications interface and the transmitting can include wirelessly transmitting the information to one or more of an external system or another robot.

Determining a distance traveled can include sending a signal via a fiber optic connection coupling the robot to a base unit. The robot can be directly connected to a network and can include a unique identifier for identifying the robot as a device on the network. The unique identifier can be one of a MAC address, an Internet Protocol address (or other identifier) and the network can be the Internet, a wide area network (WAN), a grid/mesh network, a local area network (LAN) or the like. Determining a distance traveled can include using one of an acoustic signal, an ultrasonic signal, a laser and a radio frequency signal to determine distance traveled by the robot.

DETAILED DESCRIPTION

Figure 1:
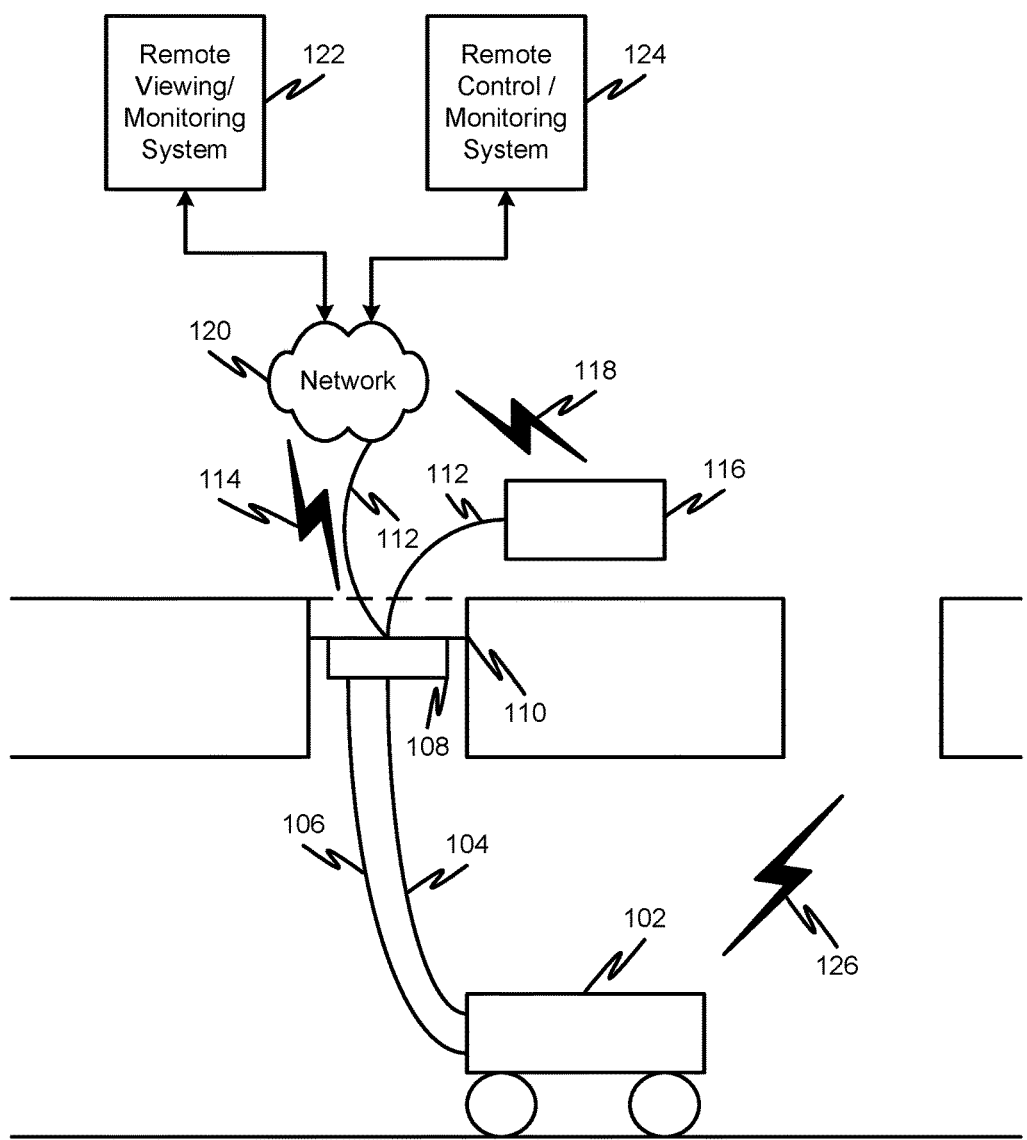
FIG. 1 is a diagram of an example autonomous robotic inspection system in accordance with some implementations.

FIG. 1 is an example autonomous robotic inspection system 100 in accordance with some implementations. The system 100 includes an autonomous (or semi-autonomous) robot 102 coupled to a base unit 108 via a fiber optic cable 104 and a mechanical tether 106. The fiber optic cable 104 can be integrated with the mechanical tether 106, or the two can be separate. The base unit can be removably attached to an object (e.g., a manhole) via an attachment system 110.

The base unit 108 can be optionally connected to a removable programming and monitoring system 116 via a wired interface 112 and/or a wireless interface 114. The base unit can communicate with a network 120 via the wireless interface 114 (or wired interface 112). A remote viewing/monitoring system 122 and/or a remote control/monitoring system 124 can be coupled to the network 120.

In operation, the base unit 108 can be coupled to a structure (e.g., a manhole opening in a water or sewer system) via the attachment system 110. The attachment system 110 can use conventional mechanisms for removably attaching the base unit 108 to the structure.

With the base unit 108 in place, the robot 102 can be lowered into the structure for inspection. The mechanical tether 106 (e.g., cable, rope or the like) can be used to lower the robot 102 into the structure.

Once in the structure, the robot 102 can move according to a preprogrammed course or under direction from autonomous inspection software or via wireless remote control. The robot 102 can move via a locomotion system (not shown) that can include wheels, tracks or the like. In general, any known or later developed system for robot locomotion may be used.

As the robot 102 advances through the structure it can acquire information or data from one or more sensors or sensor systems connected to the robot 102. The one or more sensors can include a digital image sensor, video camera, temperature sensor, distance measuring device, depth measuring device, sonar sensor system, radar sensor system, LiDAR sensor system, laser sensor system, a radiation sensor (e.g., for sensing one or more of gamma radiation, x-ray radiation, ultraviolet radiation, visible radiation, infrared radiation, terahertz radiation, microwave radiation and/or radio waves), gas sensor, and/or the like. The one or more sensors can also include one or more of a digital scanning system, a laser profiling system, a sonar/ultrasonic system, a ground penetrating radar and an infrared thermography system. The acquired information can include information received from one or more of the sensors or sensor systems listed above or any other suitable sensors or sensor systems.

Digital scanning is a state-of-the-art technology within the camera inspection industry. Like conventional CCTV, digital cameras are transported through sewer lines using self-propelled crawlers. Unlike conventional CCTV systems, digital scanning uses one or two high-resolution digital cameras with wide-angle lenses in the front, or front and rear, section of the housing. During pipe inspections, parallel mounted lights are triggered at the same position in the pipe. The hemispherical pictures scanned can be put together to form 360° spherical images. Another approach includes using a single camera with a wide angle lens to accomplish the same result. During the scanning process, data are transmitted to a surface viewing station where it can be viewed in real-time and recorded for later evaluation. An advantage to digital scanning technology is that it is possible for the data to be assessed independently of the real-time inspection. By comparison, conventional CCTV relies on a camera operator to pan, tilt, and zoom into critical areas for further review. The image, as controlled by the operator, is stored. Therefore, if the operator does not see a defect, the camera may not be stopped for further investigation.

Digital scanning can develop a full digital image of the pipe segment. This allows the individual reviewing the images post-inspection to control the direction viewing features and to stop the image at any point to capture video clips and images of areas of interest. The inner pipe surface can be "unfolded" providing a view of pipe conditions, which permits computer-aided measurement of defects and objects. Digital scanning can provide a more consistent and complete assessment of pipe condition. Digital scanning can provide a second level of quality control in the review process and allows other individual(s) involved in the process to gain insight into the pipe condition (e.g., designers, rehabilitation contractors, and utility owners).

Digital scanning technology is often used for gravity lines in the 6-in. to 60-in. diameter range. Its applicability for use in inspecting sewer laterals may be limited since laterals are typically less than 6 in. in diameter and access is generally through a small diameter clean-out. It is also limited in its ability to inspect force mains. Like conventional CCTV technology, digital scanning is typically able to provide useful images above the waterline; force mains would have to be taken out of service and drained before digital recording. Access to force mains also typically restricts the use of digital and CCTV technology. Force mains are pressurized and do not have access manholes to insert CCTV equipment. Digital scanning can be used with any pipe material.

Laser profiling can generate a profile of a pipe's interior wall. The technique involves using a laser to create a line of light around the pipe wall. For this reason, it is also called the lightline method. The laser light highlights the shape of the sewer pipe (or other object), allowing for the detection of changes to the pipe's shape, which may be caused by deformation, corrosion, or siltation. Laser inspection is typically used to inspect dry portions of a pipe. To assess the entire internal surface of a pipeline may require the pipe to be taken out of service. Lasers are often used in combination with other inspection methods, most commonly video and/or sonar.

Sonar/ultrasonic inspections of pipelines can be accomplished by passing a sonar head (e.g., attached to robot) through the pipe being inspected. As the sonar head moves through the pipeline, it sends out very high frequency ultrasonic signals, which are reflected by the pipe walls and then received by the sonar head. The reflection of the signals changes when there is a change in the material it is being reflected by, allowing for the detection of defects. The time between when the signal is sent and received can be used to determine the distance between the sonar head and the pipe wall, as well as to determine the internal profile of the pipe. Sonar inspection results in a detailed profile of the pipe wall below the water surface, which can be analyzed by a variety of methods. Sonar can detect pipe wall deflections, corrosion, pits, voids, and cracks. Sonar inspection can also detect and quantify debris, grease, and silt, and can distinguish between hard and soft debris; however, defects in the pipe wall can sometimes be obscured by grease and debris. In some implementations, defects greater than ⅛ inch (3 mm) can be detected. This applies to pipe wall pitting and cracks as well as debris accumulation. Sonar does not require bypass pumping or pipe cleaning. Sonar inspection can be used in areas of poor visibility where it is difficult to use video (or other imaging) inspection. It is a versatile inspection method and can be used for inspecting gravity sewers and force mains.

The robot 102 can track its position based on the locomotion system. However, this measurement may not always be accurate due to wheel slippage or the like. So, the robot 102 (or base unit 108) may be able to determine a distance the robot has traveled (e.g., to determine the distance from the mouth of the pipe to the location of the robot) based on techniques used for fiber optics. For example, an implementation can use a transmitter to transmit a "ping" (e.g., a signal sent down the fiber optic cable) and measuring the time it takes for the ping to return to the transmitter.

For example, shape-sensing optical fiber systems can be used to compute the bend of optical fibers in a three-axis space at every discrete point along their length. Determining the total length in such systems requires a computation to take into account the various bends along the length of the device. For example, Clements (U.S. Pat. No. 6,888,623 B2, incorporated herein by reference) describes a fiber optic sensor for precision 3-D position measurement that includes a flexible "smart cable" that enables accurate measurement of local curvature and torsion along its length.

Greenaway et al. (U.S. Pat. No. 6,301,420 B1, incorporated herein by reference) describes a device having two or more core regions, each core region comprising a transparent core material with a core refractive index, a core length, and a core diameter. The cladding region and the core regions may be arranged such that a laser input to the optical fiber propagates along one or more of the lengths of the core regions in a single mode of propagation. The measurement of the relative shift in the fringe pattern provides an indication of the extent by which the fiber is bent, which can be used to determine a straight line distance between two objects, each tethered to opposite ends of the device (i.e., cable).

Schiffner (U.S. Pat. No. 4,443,698, incorporated herein by reference) describes a sensing device having a sensing element in the form of an optical fiber, a device for coupling light into the fiber and a device for measuring changes in the specific physical parameters of the light passing through the fiber, to determine special physical influences applied to the fiber and through additional processing measures a distance between two objects, each tethered to opposite ends of the device.

Haake (U.S. Pat. No. 5,563,967, incorporated herein by reference) and Froggatt (U.S. Pat. No. 5,798,521, incorporated herein by reference) through additional processing also measure a distance between two objects, each tethered to opposite ends of a fiber device.

Childers (US. Pub. 20070065077, incorporated herein by reference) employs a fiber optic position and shape sensing device using at least two single core optical fibers where the strain on the optical fiber is measured and correlated to local bend measurements to determine the position or shape of the optical fibers.

The robot 102 and/or base unit 108 can employ one or more of the techniques mentioned above to use the fiber optic cable 104 to measure a distance traveled by the robot 102 in the structure. As the robot 102 determines its position and/or distance traveled, the robot 102 can relate or associate the position and/or distance with the information (or data) being collected by the one or more sensors. For example, the robot 102 may include one or more image sensors and a lighting system to enable the robot 102 to capture digital images of the inside of a sewer pipe. Each image captured can be associated with metadata such as time, date and/or distance or location of the robot 102 when the image was acquired.

The information being collected by the robot 102 can be stored in a nontransitory memory device in the robot 102 and/or transmitted to the base unit 108 via the fiber optic cable 104. The base unit 108 can then, in turn, transmit the collected information to an external system (e.g., 122 or 124) via a wired or wireless connection. Alternatively, or in addition to the above, the robot 102 can directly transmit the information via a wired (e.g., 104) or wireless (e.g., 126) connection to an external system (e.g., 122 or 124) via a network (e.g., 120).

Some implementations can include an autonomous inspection robot that is configured to supply imagery (still images and/or video) or other data to an external system via a data link (e.g., fiber optic link, wireless link or the like) at a real-time or near real-time rate (e.g., transmitting at a time and data rate to supply the imagery data to an observer as the robot is acquiring the data). The transmission of images can be done when the autonomous robot reaches a selected or predetermined position. For example, a city employee may be familiar with a sewage system and may suspect a certain portion of the system to have a problem. Also, knowing the layout of the city's sewer lines, the employee estimates that the problem is located somewhere between manhole covers A and B, which are spaced about 400 feet apart from each other. So, if the autonomous robot is deployed at manhole cover A, it can be instructed to provide images from about 190 feet to about 210 feet from the mouth of a pipe accessible via manhole cover A, so as to cover the portion about halfway in between manhole covers A and B. In general, the autonomous robot can be configured to supply data corresponding to (or associated with) a selected or predetermined location (or range of positions) within another object, such as a pipe, or corresponding to (or associated with) a given distance from an object or reference point within an object (e.g., mouth of a pipe). This capability can provide real-time (or near real-time) information from the autonomous robot as it navigates the object.

Figure 2:
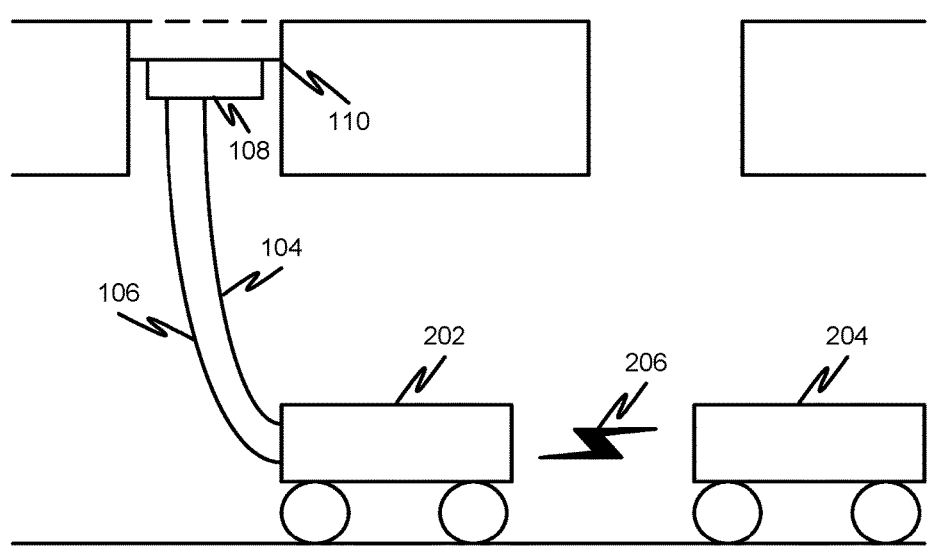
FIG. 2 is a diagram of another example autonomous robotic inspection system in accordance with some implementations.

FIG. 2 is a diagram of another example autonomous robotic inspection system 200 in accordance with some implementations. The system 200 includes a first robot 202 and a second robot 204. The robots (e.g., 202 and 204) can include the components and functionality mentioned above regarding robot 102 of FIG. 1. In addition to the above-mentioned components and functionality, the robots 202 and 204 include communication interfaces for communicating with each other over a wireless (or wired) link 206.

In operation, the robots 202 and 204 can be lowered or placed into a structure being inspected. A first robot 202 can be tethered to the base unit 108 via a fiber optic data link 104 (as discussed above) and/or a mechanical tether 106. A second robot 204 can be placed into the structure. The second robot 204 may or may not be tethered.

The first robot 202 and the second robot 204 can each autonomously conduct inspections of the structure. The second robot 204 can relay collected information (e.g., from the sensors and/or position/distance determination systems) to the first robot 202 via the link 206.

The first robot 202 can relay movement and/or data collection instructions (e.g., begin inspection, end inspection, acquire data, return to starting point, or the like) to the second robot 204.

The first robot 202 and the second robot 204 can include a mechanical coupling system (not shown) for coupling the two robots for placement and removal from the structure.

Figure 3:
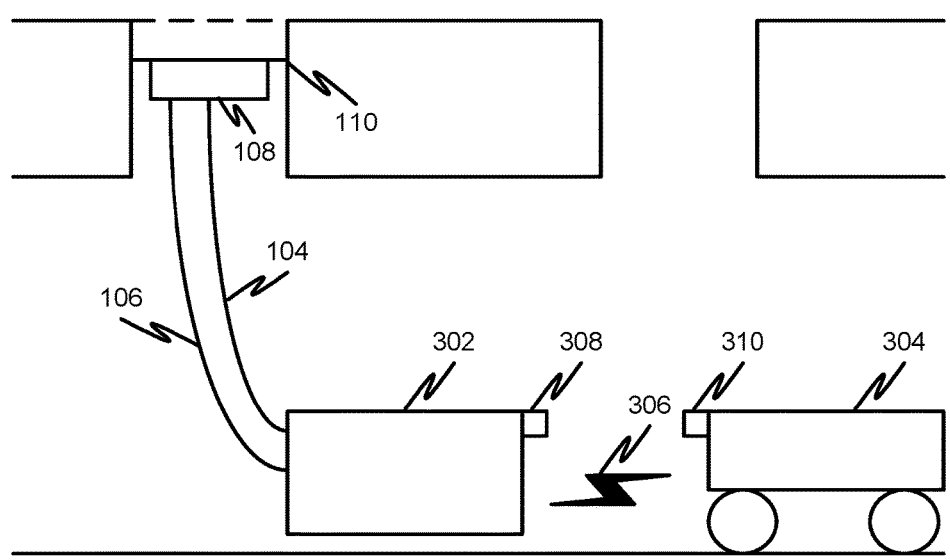
FIG. 3 is a diagram of yet another example autonomous robotic inspection system in accordance with some implementations.

FIG. 3 is a diagram of yet another example autonomous robotic inspection system 300 in accordance with some implementations. The system 300 includes a remote base station 302 and a robot 304. The robot 304 can include the components and functionality mentioned above regarding robot 102 of FIG. 1. In addition to the above-mentioned components and functionality, the robot 304 includes a communication interface for communicating with the remote base station 302 via a wireless (or wired) link 306.

In operation, the mobile base station 302 and the robot 304 can be lowered or placed into a structure being inspected. A remote base station 302 can be tethered to the base unit 108 via a fiber optic data link 104 (as discussed above) and/or a mechanical tether 106. The robot 304 may or may not be tethered.

The robot 304 can conduct inspections of the structure. The robot 304 can relay collected information (e.g., from the sensors and/or position/distance determination systems) to the remote base station 302 via the link 306. The remote base station 302 can also include one or more of the components and sensors mentioned above and can collect information from the structure.

The remote base station 302 can relay movement and/or data collection instructions (e.g., begin inspection, end inspection, acquire data, return to starting point, or the like) to the robot 304.

The remote base station 302 and the robot 304 can include a mechanical coupling system (308 and 310, respectively) for coupling the robot 304 to the remote base station 302 for placement and removal from the structure.

Figure 4:
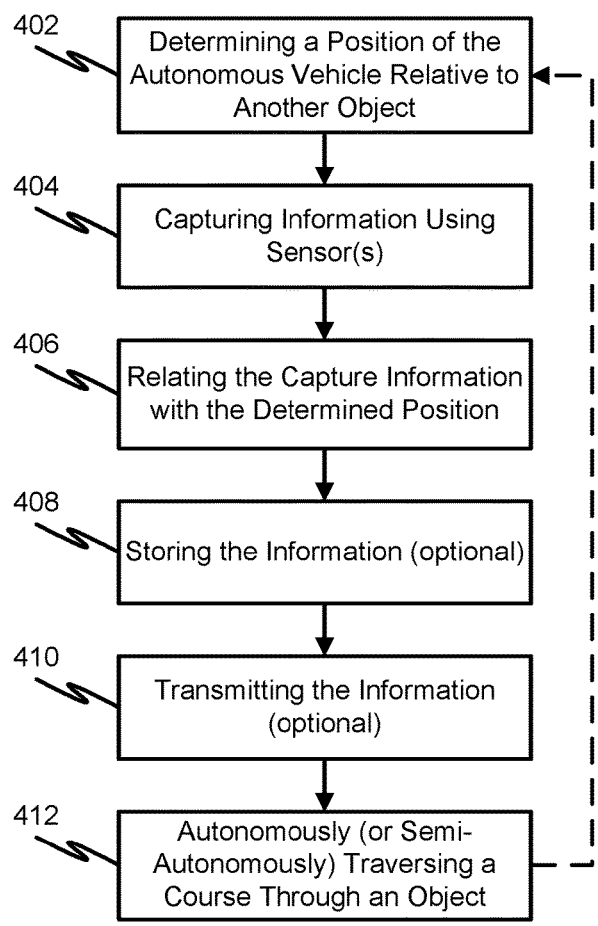
FIG. 4 is a flow chart of an example autonomous robotic inspection method in accordance with some implementations.

FIG. 4 is a flow chart of an example autonomous robotic inspection method in accordance with some implementations. Processing begins at 402, where an autonomous vehicle (e.g., 102, 202, 204, and/or 304) determines its position relative to another object (e.g., the mouth of a pipe, the Earth, a structure being inspected, or the like). The position determination can include determining a distance traveled as discussed above (e.g., via the fiber optic cable), or determining a position or location using a system such as micro location (e.g., using near field communications, RFID, Bluetooth Low Energy or the like), GPS and/or radio triangulation. Processing continues to 404.

At 404, information is captured from one or more sensors on board or coupled to the autonomous vehicle. The sensors can include one or more of the sensors mentioned above and can include information about a structure being inspected. Processing continues to 406.

At 406, the captured or collected information is related or associated with the position determined in 402. Thus, the captured sensor data can be related to a position or location within a structure being inspected. Processing continues to 408.

At 408, the information (and associated position data) can be optionally stored in a data storage device in the autonomous vehicle. Processing continues to 410.

At 410, the information is optionally transmitted to another system either directly or via an intermediate system such as a base unit. Processing continues to 412.

At 412, the autonomous vehicle is controlled to autonomously traverse a course through an object or structure. Optionally, the vehicle can be under manual or semi-automatic control in which input from a human operator or another system is used to guide the autonomous vehicle.

It will be appreciated that 402-412 can be repeated in whole or in part in order to accomplish a contemplated autonomous inspection task.

Figure 5:
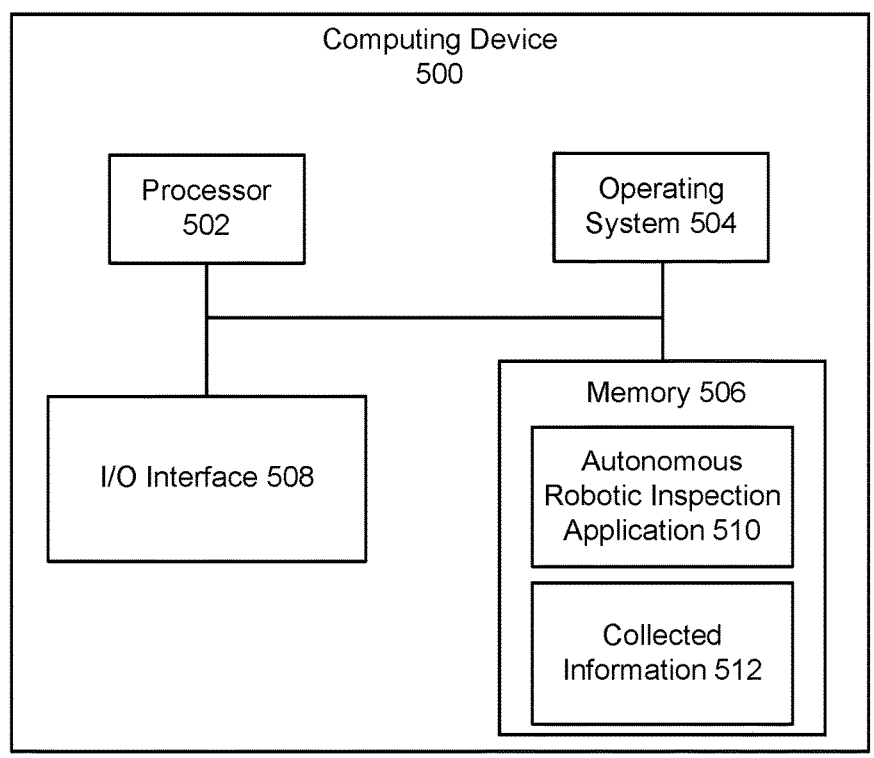
FIG. 5 is an example computer system for autonomous robotic inspection in accordance with some implementations.

FIG. 5 is a diagram of an example computing device 500 that can be used for autonomous inspection systems in accordance with some implementations. The computing device 500 can include one or more processors 502, an operating system 504, memory 506 and an I/O interface 508. The memory 506 can include an autonomous inspection application 510 and, optionally, information collected during an inspection 512.

In operation, the processor 502 may execute the autonomous inspection application 510 stored in the memory 506. The autonomous inspection application 510 can include software instructions that, when executed by the processor, cause the processor to perform operations for autonomous inspection in accordance with the present disclosure (e.g., the autonomous inspection application 510 can cause the processor to perform one or more of steps 402-412 described above and, in conjunction, can optionally access the stored inspection data 512). The autonomous inspection application 510 can also operate in conjunction with the operating system 504.

The computer (e.g., 500) can include, but is not limited to, a single processor system, a multi-processor system (co-located or distributed), a cloud computing system, or a combination of the above.

The system monitoring and/or control device can include, but is not limited to, a desktop computer, a laptop computer, a portable computer, a tablet computing device, a smartphone, a feature phone, a personal digital assistant, a media player, an electronic book reader, an entertainment (or computing) system of a vehicle or the like. Other examples of devices include computing and/or display systems built into windows, walls, furniture, glasses, goggles, wrist watches, clothing or the like. In general, any computing device capable of implementing one or more of the methods described herein can be used.

The networks connecting devices in an autonomous inspection system can be wired or wireless networks, and can include, but are not limited to, a WiFi network, a local area network, a wide area network, the Internet, or a combination of the above.

The data storage, memory and/or nontransitory computer readable medium can be a magnetic storage device (hard disk drive or the like), optical storage device (CD, DVD or the like), electronic storage device (RAM, ROM, flash, solid state drive, or the like). The software instructions can also be contained in, and provided as, an electronic signal, for example in the form of software as a service (SaaS) delivered from a server (e.g., a distributed system and/or a cloud computing system).

Moreover, some implementations of the disclosed method, system, and computer readable media can be implemented in software (e.g., as a computer program product and/or nontransitory computer readable media having stored instructions for performing one or more persistent conversation tasks as described herein). The stored software instructions can be executed on a programmed general purpose computer, a special purpose computer, a microprocessor, or the like.

It is, therefore, apparent that there is provided, in accordance with the various example implementations disclosed herein, systems, methods and computer readable media for autonomous robotic inspection.

While the disclosed subject matter has been described in conjunction with a number of implementations, it is evident that many alternatives, modifications and variations would be or are apparent to those of ordinary skill in the applicable arts. Accordingly, Applicant intends to embrace all such alternatives, modifications, equivalents and variations that are within the spirit and scope of the disclosed subject matter.

What is claimed is:

1. An autonomous robotic inspection system comprising:
   a robot having one or more processors, a memory device, one or more sensors, a communications interface and a locomotion subsystem; and
   a base unit coupled to the robot via a fiber optic cable and having a mechanical tether connected to the robot for retrieving the robot, wherein the base unit is removably attached to an object via an attachment system, and
   wherein the one or more processors in the robot are configured to perform operations including:
      determining a position of the robot relative to another object including determining a distance traveled based on a signal transmitted via the fiber optic cable;
      acquiring information from the one or more sensors;
      relating the acquired information with the determined position;
      transmitting the acquired information to a mobile base station coupled to the base unit as a real-time data feed from a location within the other object, wherein the acquired information includes one or more of a still image and a video, and wherein the mobile base station relays one or more instructions to the robot; and
      autonomously traversing a course through the other object.

2. The system of claim 1, further including a removable programming and monitoring system configured to connect to the base unit and exchange data with the robot via the base unit.

3. The system of claim 1, wherein the communications interface includes a wireless communications interface and the transmitting includes wirelessly transmitting the information to one or more of the base unit, an external system, or another robot.

4. The system of claim 1, wherein the base unit includes a wireless communication interface and the base unit is configured to receive the information from the robot and wirelessly transmit the information to another system.

5. The system of claim 1, wherein the robot is directly connected to a network and includes a unique identifier for identifying the robot as a device on the network.

6. The system of claim 5, wherein the unique identifier is one of a MAC address and an Internet Protocol address and the network is the Internet.

7. A method for autonomous robotic inspection comprising:
   determining, at a robot having a processor, a position of the robot relative to another object including determining a distance traveled;
   acquiring, at the robot, information from one or more sensors;
   relating, at the robot, the acquired information with the determined position;
   transmitting, from the robot, via a communications link, the acquired information to a mobile base station coupled to a base unit as a real-time data feed from a location within the other object, wherein the acquired information includes one or more of a still image and a video, and wherein the mobile base station relays one or more instructions to the robot; and
   autonomously traversing a course through the other object.

8. The method of claim 7, further comprising connecting to a removable programming and monitoring system and exchanging data between the robot and the removable programming and monitoring system via the base unit coupled to the robot.

9. The method of claim 7, wherein the communications link includes a wireless communications interface and the transmitting includes wirelessly transmitting the acquired information to one or more of the base unit, an external system, or another robot.

10. The method of claim 7, wherein the determining of the distance traveled includes sending a signal via a fiber optic connection coupling the robot to the base unit.

11. The method of claim 7, wherein the robot is directly connected to a network and includes a unique identifier for identifying the robot as a device on the network.

12. The method of claim 11, wherein the unique identifier is one of a MAC address and an Internet Protocol address and the network is the Internet.

13. The method of claim 7, wherein the determining of the distance traveled includes using one of an acoustic signal, a light signal, an ultrasonic signal, a laser, or a radio frequency signal to determine the distance traveled by the robot.

14. A nontransitory computer readable medium having software instructions stored thereon that, when executed by a processor, cause the processor to perform operations comprising:
   determining, at a robot including the processor, a position of the robot relative to another object including determining a distance traveled;
   acquiring, at the robot, information from one or more sensors;
   relating, at the robot, the acquired information with the determined position;
   transmitting, from the robot, the acquired information to a mobile base station coupled to a base unit as a real-time data feed from a location within the other object, wherein the acquired information includes one or more of a still image and a video and wherein the mobile base station relays one or more instructions to the robot; and
   autonomously traversing a course through the other object.

15. The nontransitory computer readable medium of claim 14, wherein the instructions stored thereon further include instructions that when executed by the processor, cause the processor to perform further operations including connecting to a removable programming and monitoring system and exchanging data between the robot and the removable programming and monitoring system via the base unit coupled to the robot.

16. The nontransitory computer readable medium of claim 14, wherein the instructions stored thereon further include instructions that when executed by the processor, cause the processor to perform further operations including wirelessly transmitting the information to one or more of the base unit, the mobile base station, an external system, or another robot.

17. The nontransitory computer readable medium of claim 14, wherein the instructions stored thereon further include instructions that when executed by the processor, cause the processor to perform further operations including sending a signal via a fiber optic connection coupling the robot to the base unit.

18. The nontransitory computer readable medium of claim 14, wherein the instructions stored thereon further include instructions that when executed by the processor, cause the processor to perform further operations including using one of an acoustic signal, an ultrasonic signal, a laser, or a radio frequency signal to determine the distance traveled by the robot.

* * * * *